(12) United States Patent
Yamamura et al.

(10) Patent No.: US 8,927,632 B2
(45) Date of Patent: Jan. 6, 2015

(54) POLYLACTIC ACID BASED FILM

(75) Inventors: Gouhei Yamamura, Otsu (JP); Jun Sakamoto, Otsu (JP); Masanori Sueoka, Otsu (JP); Masayuki Hirota, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/000,904

(22) PCT Filed: Jan. 24, 2012

(86) PCT No.: PCT/JP2012/051421
§ 371 (c)(1),
(2), (4) Date: Aug. 22, 2013

(87) PCT Pub. No.: WO2012/114810
PCT Pub. Date: Aug. 30, 2012

(65) Prior Publication Data
US 2013/0331493 A1     Dec. 12, 2013

(30) Foreign Application Priority Data
Feb. 24, 2011     (JP) .................................. 2011-038041

(51) Int. Cl.
*C08L 67/04*     (2006.01)

(52) U.S. Cl.
USPC ......................................... 524/145; 524/400

(58) Field of Classification Search
USPC .................................................. 524/145, 400
See application file for complete search history.

(56) References Cited

U.S. PATENT DOCUMENTS

2010/0009208 A1*     1/2010     Lee ................................ 428/483

FOREIGN PATENT DOCUMENTS

| JP | 02-296874 | | 12/1990 |
|---|---|---|---|
| JP | 03-285944 | A | 12/1991 |
| JP | 04-039336 | A | 2/1992 |
| JP | 07-331038 | A | 12/1995 |
| JP | 2004-149679 | A | 5/2004 |
| JP | 2007-112867 | A | 5/2007 |
| JP | 2008-169239 | A | 7/2008 |
| JP | 2009-138085 | A | 6/2009 |

\* cited by examiner

*Primary Examiner* — Robert D. Harlan
(74) *Attorney, Agent, or Firm* — DLA Piper LLP (US)

(57) ABSTRACT

A polylactic acid based film includes a composition containing a polylactic acid based resin (A), a thermoplastic resin other than polylactic acid based resin (B), and a compound treated with a surface treatment agent as filler (C), the polylactic acid based resin containing a crystalline polylactic acid based resin and an amorphous polylactic acid based resin, and resin (A) accounting for 10 to 95 mass % and resin (B) accounting for 5 to 90 mass % of a combined total of 100 mass % of resin (A) and resin (B), and filler (C) accounting for 10 to 400 parts by mass per a combined total of 100 parts by mass of resin (A) and resin (B).

20 Claims, No Drawings

POLYLACTIC ACID BASED FILM

TECHNICAL FIELD

This disclosure relates to a polylactic acid based film that has high flexibility, heat resistance, bleed-out resistance, and durability as well as high processability to permit stretching and embossing required for developing high moisture permeability.

BACKGROUND

With the heightening of environment consciousness in recent years, attention is focused on soil contamination problems caused by waste plastic products, and attention is also focused on global warming problems due to an increase in the carbon dioxide concentration caused by combustion of waste. Research and development studies have been performed actively on various biodegradable resins and biomass (plant-derived material) based resins, whose incineration will not increase the carbon dioxide load on the atmosphere, as means of solving the former and the latter problems, respectively. Expectations are growing for polylactic acid as it is able to meet both of the above purposes and relatively advantageous in terms of cost as well. Polylactic acid materials cannot be sufficiently high in flexibility and impact resistance if applied to uses where flexible films of polyolefins such as polyethylene have been conventionally adopted, and a variety of attempts are being made in an effort to improve them in these characteristics to provide practical materials.

In the field of porous film production, Japanese Unexamined Patent Publication (Kokai) No. 2007-112867, for instance, has disclosed a porous sheet that is produced by stretching at least uniaxially a sheet containing a polylactic acid resin, a filler, and a common polyester based plasticizer. Japanese Unexamined Patent Publication (Koaki) No. 2004-149679 has disclosed a porous film produced from a polylactic acid based polymer, aliphatic aromatic copolymerization polyester and, in addition, a common plasticizer selected from the group consisting of an aliphatic multivalent carboxylate, aliphatic polyhydric alcohol ester, aliphatic polyhydric alcohol ether, and oxyacid ester, in which pores are formed by adding a fine powder filler.

The aforementioned techniques described in JP '867 and JP '679 can produce biodegradable flexible films with a high biomass content, but they are inferior in processability.

Thus, although studies have been made aiming to provide flexible films with high biodegradability and high biomass content, they all have failed to have a sufficient moisture permeability, and no efforts have been successful in inventing such films also having both high moisture permeability and high bleed-out resistance.

It could therefore be helpful to provide a polylactic acid based film that has high flexibility, heat resistance, bleed-out resistance, and durability as well as high processability to permit stretching and embossing required for developing high moisture permeability.

SUMMARY

We thus provide:
1) Polylactic acid based film comprising a composition containing a polylactic acid based resin, referred to as resin (A), a thermoplastic resin other than polylactic acid based resin, referred to as resin (B), and a compound treated with a surface treatment agent, referred to as filler (C),
   the polylactic acid based resin containing a crystalline polylactic acid based resin and an amorphous polylactic acid based resin, and
   resin (A) accounting for 10 to 95 mass % and resin (B) accounting for 5 to 90 mass % of a combined total of 100 mass % of resin (A) and resin (B), and filler (C) accounting for 10 to 400 parts by mass per a combined total of 100 parts by mass of resin (A) and resin (B).
2) Polylactic acid based film as described in paragraph 1) wherein the surface treatment agent is a phosphate based compound and/or fatty acid.
3) Polylactic acid based film as described in either paragraph 1) or 2) wherein the surface treatment agent contains a methacrylate group.
4) Polylactic acid based film as described in any one of paragraphs 1) to 3) wherein filler (C) is produced by subjecting an inorganic filler and/or organic filler to treatment with a surface treatment agent and wherein the specific surface area S ($m^2/g$) of the inorganic filler and/or organic filler and the percentage by mass T (mass %) of that portion of filler (C) originating from the surface treatment agent meet the requirement given below:

$0.15 \leq T/S \leq 0.45$.

5) Polylactic acid based film as described in any one of paragraphs 1) to 4) wherein resin (B) is at least one resin selected from the group consisting of a block copolymer containing a polyether based segment and a polylactic acid segment, a block copolymer containing a polyester based segment and a polylactic acid segment, an aliphatic polyester based resin, and an aliphatic-aromatic polyester based resin.
6) Polylactic acid based film as described in paragraph 5) wherein resin (B) comprises at least one resin selected from the group consisting of a block copolymer containing a polyether based segment and a polylactic acid segment and a block copolymer containing a and polyester based segment and a polylactic acid segment and at least one resin selected from the group consisting of an aliphatic polyester based resin and an aliphatic-aromatic polyester based resin.
7) Polylactic acid based film as described in any one of paragraphs 1) to 6) produced from a composition prepared by reacting resin (A) and/or resin (B) with a reactive compound.
8) Polylactic acid based film as described in any one of paragraphs 1) to 7) wherein the tensile elongation percentage is 150 to 500%.
9) Polylactic acid based film as described in any one of paragraphs 1) to 8) wherein the tensile modulus is 100 to 1,500 MPa.
10) Polylactic acid based film comprising a composition containing a polylactic acid based resin as resin (A) and also containing filler (C) and/or filler (D) in an amount of 10 to 400 parts by mass per a total mass of resin which accounts for 100 parts by mass,
    filler (C) being a compound treated with a surface treatment agent,
    filler (D) being an inorganic filler and/or organic filler untreated with a surface treatment agent, and
    the tensile elongation percentage being 150 to 500%.

We provide mainly a polylactic acid based film that has high flexibility, heat resistance, bleed-out resistance, and durability as well as high processability to permit stretching and embossing required to develop high moisture permeability. Our polylactic acid based films can serve as films to be processed by, for instance, stretching and embossing to produce materials mainly requiring flexibility, moisture permeability, and heat resistance, including those for medical care and sanitary supplies such as back sheets of bed sheet, pillowcase, sanitary napkin, and other absorbent products; clothing materials such as rainwear and gloves; garbage bag and compost bag; food bags for vegetables and fruits; and bags for industrial products and other packaging materials.

DETAILED DESCRIPTION

We developed a polylactic acid based film that has high flexibility, heat resistance, bleed-out resistance, and durability as well as high processability to permit stretching and embossing required to develop high moisture permeability. We thus use a composition containing specific types of specific resin and filler and a surface-treated compound as the filler. Our polylactic acid based films comprise a composition containing a polylactic acid based resin, referred to as resin (A), a thermoplastic resin other than polylactic acid based resin, referred to as resin (B), and a compound treated with a surface treatment agent, referred to as filler (C); the polylactic acid based resin containing a crystalline polylactic acid based resin and an amorphous polylactic acid based resin; resin (A) accounting for 10 to 95 mass % and resin (B) accounting for 5 to 90 mass % of a combined total of 100 mass % of resin (A) and resin (B); and filler (C) accounting for 10 to 400 parts by mass per a combined total of 100 parts by mass of resin (A) and resin (B).

Described below is one version of our polylactic acid based film.

First Polylactic acid based film

Resin (A) (polylactic acid based resin)

It is important for polylactic acid based film to be one produced from a composition containing resin (A). Resin (A) is a polylactic acid based resin. Polylactic acid based resin is defined as a polymer containing, as a main component, a L-lactic acid and/or a D-lactic acid. A "main component" accounts for the largest proportion by mass of the lactic acid units in the 100 mass % quantity of the polymer. The lactic acid units preferably account for a mass proportion of 70 mass % to 100 mass % per 100 mass % of the polymer.

A poly-L-lactic acid as referred to herein is a the polylactic acid polymer in which the poly-L-lactic acid accounts for more than 50 mol % and 100 mol % or less of the total lactic acid units, which account for 100 mol %, in the polymer. A poly-D-lactic acid as referred to, on the other hand, is a polylactic acid polymer in which the poly-D-lactic acid accounts for more than 50 mol % and 100 mol % or less of the total lactic acid units, which account for 100 mol %, in the polymer.

A poly-L-lactic acid changes in resin crystallinity depending on the content of D-lactic acid units. Specifically, a poly-L-lactic acid decreases in crystallinity and increases in amorphousness with an increasing content of D-lactic acid units in the poly-L-lactic acid while a poly-L-lactic acid increases in crystallinity with a decreasing content of D-lactic acid units in the poly-L-lactic acid. Similarly, a poly-D-lactic acid changes in resin crystallinity depending on the content of L-lactic acid units. Specifically, a poly-D-lactic acid decreases in crystallinity and increases in amorphousness with an increasing content of L-lactic acid units in the poly-D-lactic acid while a poly-D-lactic acid increases in crystallinity with a decreasing content of L-lactic acid units in the poly-D-lactic acid.

The L-lactic acid units in a poly-L-lactic acid or the D-lactic acid units in a poly-D-lactic acid preferably accounts for 80 to 100 mol %, more preferably 85 to 100 mol %, of the total lactic acid units, which account for 100 mol %, from the viewpoint of maintaining required mechanical strength.

A crystalline polylactic acid based resin as referred to is a polylactic acid based resin that shows a crystal melting point attributed to a polylactic acid component when subjecting the polylactic acid resin to measurement by differential scanning calorimetry (DSC) in an appropriate temperature range after crystallizing it adequately under heat.

An amorphous lactic acid based resin as referred to, on the other hand, is a lactic acid based resin that does not show a distinct melting point when subjected to the same measurement.

As described later, it is important that the polylactic acid based resin used as resin (A) in the composition to form a polylactic acid based film be a mixture of a crystalline polylactic acid based resin and an amorphous polylactic acid based resin.

A polylactic acid based resin may be a copolymer containing monomer units other than lactic acid. Such other monomers include glycol compounds such as ethylene glycol, propylene glycol, butanediol, heptanediol, hexanediol, octanediol, nonanediol, decanediol, 1,4-cyclohexane dimetanol, neopentyl glycol, glycerin, pentaerythritol, bisphenol A, polyethylene glycol, polypropylene glycol, and polytetramethylene glycol; dicarboxylic acids such as oxalic acid, adipic acid, sebacic acid, azelaic acid, dodecanedioic acid, malonic acid, glutaric acid, cyclohexanedicarboxylic acid, terephthalic acid, isophthalic acid, phthalic acid, naphthalene dicarboxylic acid, bis(p-carboxyphenyl) methane, anthracene dicarboxylic acid, 4,4'-diphenyl ether dicarboxylic acid, 5-sodium sulfoisophthalic acid, and 5-tetrabutyl phosphonium isophthalic acid; hydroxycarboxylic acids such as glycolic acid, hydroxypropionic acid, hydroxybutyric acid, hydroxyvaleric acid, hydroxycaproic acid, and hydroxybenzoic acid; and lactones such as caprolactone, valerolactone, propiolactone, undecalactone, and 1,5-oxepane-2-one. Such other monomer units in a copolymer preferably account for 0 to 30 mol %, more preferably 0 to 10 mol %, of the total monomer units, which account for 100 mol %, in the polylactic acid based resin polymer. Of the monomer units given above, it is preferable to use biodegradable ones, depending on uses.

With respect to polylactic acid based resin, it is also preferable that a small amount of poly-D-lactic acid be contained in a polylactic acid based resin that is mainly composed of poly-L-lactic acid or that a small amount of poly-L-lactic acid be contained in a polylactic acid based resin that is mainly composed of poly-D-lactic acid. This is because stereocomplex crystals formed thereof have a higher melting point than that of common polylactic acid crystals ($\alpha$-crystals), and form a film with improved heat resistance. It is preferable that the mass average molecular weight of such polylactic acid to be added in a small amount be smaller than the mass average molecular weight of the polylactic acid used as the primary component from the viewpoint of efficient formation of stereocomplex crystals. It is preferable that the mass average molecular weight of such polylactic acid to be added in a small amount be 0.5 to 50%, more preferably 1 to 40%, and still more preferably 2 to 30%, of the mass average molecular weight of the polylactic acid used as the primary component.

To meet practical mechanical characteristics, a polylactic acid based resin preferably has a mass average molecular weight of 50,000 to 500,000, more preferably 80,000 to 400,000, and still more preferably 100,000 to 300,000. The mass average molecular weight as referred to herein is defined as a molecular weight measured by gel permeation chromatography (GPC) using chloroform as solvent and converted in terms of polymethyl methacrylate.

As described in detail later, polylactic acid based resin can be produced by a generally known method such as direct polymerization from lactic acid and ring opening polymerization via lactide.

It is important for resin (A) contained in a polylactic acid based film to account for 10 to 95 parts by mass assuming that resin (A) and resin (B), which is described in detail later, in total account for 100 parts by mass. The bleed-out resistance is not sufficiently high if the content of resin (A) is less than 10 mass % assuming that resin (A) and resin (B) account for 100 mass % in total, while the flexibility is not sufficiently high if it is more than 95 mass %. Resin (A) preferably accounts for 20 to 90 mass %, more preferably 30 to 85 mass %, and still more preferably 40 to 80 mass %, assuming that resin (A) and the undermentioned resin (B) account for 100 mass % in total.

The content of resin (A) in the entire composition used to form a polylactic acid based film is preferably 5 to 80 mass %, more preferably 15 to 70 mass %, still more preferably 25 to 60 mass %, and particularly preferably 35 to 50 mass %.

Resin (B) (a Thermoplastic Resin Other than Polylactic Acid Based Resin)

It is important for polylactic acid based film to be one produced from a composition containing resin (A) to ensure improved moisture permeability after processing as well as improved flexibility. Resin (B) is a thermoplastic resin other than polylactic acid based resin. Such thermoplastic resins other than other than polylactic acid based resin include polyacetal, polyethylene, polypropylene, polyamide, poly(meth)acrylate, polyphenylene sulfide, polyether ether ketone, polyester, polyurethane, polyisoprene, polysulfone, polyphenylene oxide, polyimide, polyetherimide, ethylene/glycidylmethacrylate copolymer, polyester elastomer, polyamide elastomer, ethylene/propylene terpolymer, ethylene/butene-1 copolymer, thermoplastic starch, starch-containing polymer, and various resin based plasticizers.

Specific example of polyesters usable as resin (B) include aromatic polyester based resins such as polyethylene terephthalate, polypropylene terephthalate, and polybutylene terephthalate; aliphatic aromatic polyester based resins such as poly(ethylene succinate-terephthalate), poly(butylene succinate-terephthalate), and poly(butylene adipate-terephthalate); and aliphatic polyester based resins such as polyglycolic acid, poly(3-hydroxybutyrate), poly(3-hydroxybutyrate-3-hydroxyhexanoate, poly(3-hydroxybutyrate-3-hydroxyvalerate), polycaprolactone, polybutylene succinate, and poly(butylene succinate-adipate). Of these, an aliphatic-aromatic polyester based resin or an aliphatic polyester based resin is preferable for use as resin (B) which is a thermoplastic resin other than polylactic acid based resin, from the viewpoint of improving the flexibility, moisture permeability, and biodegradability.

Specific examples of usable starch-containing polymers include Mater-Bi, a biodegradable resin product supplied by Novamont.

Specific examples of various usable resin based plasticizers include polypropylene glycol, polyester based plasticizers such as sebaciate esters, polyalkylene ether based plasticizers, ether ester based plasticizers, and acrylate based plasticizers.

To depress bleed-out while increasing plasticization efficiency, in particular, the resin based plasticizer, i.e., resin (B) contained in the composition to form polylactic acid based film, preferably has a solubility parameter, SP, of $(16 \text{ to } 23)^{1/2}$ $\text{MJ/m}^3$, more preferably $(17 \text{ to } 21)^{1/2}$ $\text{MJ/m}^3$. A calculation method for calculating the solubility parameter, is shown by P. Small, J. Appl. Chem., 3, 71 (1953). Of these resin based plasticizer, the resin based plasticizer to be used as resin (B) preferably has biodegradability from the viewpoint of maintaining biodegradability of the entire film.

In view of the suitability in the fields of food packaging and for uses in the fields of agriculture and forestry, it is preferable that a resin based plasticizer to be used as resin (B) be one whose use is permitted by the U.S. Food and Drug Administration, Japan Hygienic Olefin And Styrene Plastics Association, or other such organizations, because undecomposed residues can remain, even if temporarily, in compost or agricultural land.

From the viewpoint of the bleed-out resistance of the plasticizer and the heat resistance and blocking resistance of the film, it is preferable that a resin based plasticizer to be used as resin (B) be in a solid state at room temperature (20° C.±15° C.), or more specifically, it preferably has a melting point above 35° C. such as, for instance, polyethylene glycol with a number average molecular weight of 1,000 or more. The melting point should be 150° C. or less in view of the temperature for melt-processing with a polylactic acid based resin or a thermoplastic resin other than polylactic acid based resin.

From the same viewpoint, it is more preferable that a resin based plasticizer to be used as resin (B) is either a block copolymer having a polyether segment and a polylactic acid segment, or a block copolymer having a polyester segment and a polylactic acid segment. Here polyether based segment and the polyester based segment act as a plasticizer component. A polyester based segment as referred to herein means a segment that is formed of a polyester that is not a polylactic acid. These block copolymer plasticizers are as described below (block copolymers having a polyether based segment and a polylactic acid segment and block copolymers having a polyester based segment and polylactic acid segment hereinafter are generically called block copolymer plasticizers).

The mass content of the polylactic acid segment in a block copolymer plasticizer is preferably 45 mass % or less of the entire block copolymer plasticizer because it can work effectively in a small amount to develop an intended flexibility, and it is preferably 5 mass % or more from the viewpoint of depressing the bleed-out. It is preferable that in a molecule of a block copolymer plasticizer, the polylactic acid segment has a number average molecular weight of 1,200 to 10,000. If it is 1,200 or more for the polylactic acid segment in a block copolymer plasticizer used as resin (B), adequate affinity will develop between the block copolymer plasticizer, i.e., resin (B), and resin (A) (polylactic acid based resin), and part of the polylactic acid segment will be caught in crystals formed from resin (A) (polylactic acid based resin) and form so-called "eutectics," which will act to fasten the block copolymer plasticizer, i.e., resin (B), to resin (A) and thereby serving very effectively to suppress the bleed-out of the block copolymer plasticizer. Consequently, the resulting film will have a high blocking resistance. Such a block copolymer plasticizer, furthermore, ensures a very high moisture permeability of the film after processing as compared with plasticizers that are in a liquid state at room temperature and those unable to form eutectics even if in a solid state at room temperature. This is because the resulting eutectics work to improve the efficiency of pore formation during processing (stretching, embossing, or the like) as described later. The number average molecular weight of the polylactic acid segment in a block copolymer plasticizer is more preferably 1,500 to 6,000, and still more preferably 2,000 to 5,000. To depress the bleed-out, in particular, it is preferable that L-lactic acid accounts for 95 to 100 mass % or D-lactic acid accounts for 95 to 100 mass % of the polylactic acid segment in a block copolymer plasticizer.

As described above, resin (A) is a polylactic acid based resin, and a polylactic acid based resin is a polymer containing an L-lactic acid unit and/or D-lactic acid unit as main component. The main component as referred to herein is a resin component that accounts for the largest proportion by mass among other lactic acid units in 100 mass % of the polymer. For the proportion by mass of a lactic acid unit in the block copolymer plasticizer used resin (B), this means that the proportion by mass of a lactic acid unit in 100 mass % of the block copolymer plasticizer used as resin (B) is only the second largest while a polyether based segment or polyester based segment accounts for the largest proportion by mass. It is preferable that in 100 mass % of a block copolymer plasticizer used as resin (b), the mass content of the lactic acid unit is 5 mass % to 45 mass %, and the mass content of a polyether based segment or polyester based segment is 55 mass % to 95 mass %.

Plasticizer component of the block copolymer plasticizer used as resin (B) is either a polyether based segment or a polyester based segment, of which a polyether based segment is preferable because it can work effectively in a small amount to develop flexibility as intended. from a similar point of view, it is more preferable that the polyether based segment to be used be a segment composed mainly of a polyalkylene ether. Specific examples of polyether based segment include those segments formed of polyethylene glycol, polypropylene glycol, polytetramethylene glycol, or polyethylene glycol/polypropylene glycol copolymer. The use of a polyethylene glycol based segment, in particular, is preferable because it is high in the affinity with resin (A) (polylactic acid based resin) to ensure a high modification efficiency, and particularly because addition of a small amount of a plasticizer can serve to develop an intended flexibility.

If the block copolymer plasticizer used contains a polyalkylene ether based segment, the polyalkylene ether segment tends to be easily oxidized or heat-decomposed when heated during molding or other steps and, therefore, it is preferable to add an antioxidant such as hindered phenolic one and hindered amine based one or a thermal stabilizer such as phosphorous thermal stabilizer, which will be described later.

If the block copolymer plasticizer used has a polyester based segment, the polyester based segment contained is preferably a polyester formed from polyglycolic acid, poly (3-hydroxybutyrate), poly(3-hydroxybutyrate 3-hydroxyvalerate), polycaprolactone, or an aliphatic diol such as ethylene glycol, propanediol, butanediol, polyethylene glycol, and polypropylene glycol, in combination of an aliphatic dicarboxylic acid such as succinic acid, sebacic acid, and adipic acid.

The block copolymer plasticizer may contain both a polyether based segment and a polyester based segment or only either of the segments in one molecule. If only one component is used for reasons related to the productivity or cost of the plasticizer, it is preferable to adopt a polyether based segment because addition of a small amount of the plasticizer can work effectively to develop an intended flexibility. Thus, the most preferable block copolymer plasticizer is a block copolymer of a polyether based segment and a polylactic acid segment.

It is preferable, furthermore, that the polyether based segment and the polyester based segment contained in a molecule of a block copolymer plasticizer have a number average molecular weight of 7,000 to 20,000. If they are in the above range, the resulting composition to form a polylactic acid based film will have an adequate flexibility, and at the same time, the composition also containing resin (A) (polylactic acid based resin) will be able to have a moderate level of melt viscosity, thereby serving to maintain stable film production processability during film production by, for instance, inflation molding.

There are no specific limitations on the order of connection between the segment blocks of the polyether based and/or polyester based segments and the polylactic acid segment, but it is preferable that at least one block of the polylactic acid segment is located at an end of the molecule of the block copolymer plasticizer from the viewpoint of effective depressing of bleed-out. It is most preferable that a block of the polylactic acid segment is located at both ends of the block copolymer plasticizer molecule.

Described in detail below is a case where a polyethylene glycol (hereinafter, polyethylene glycol is abbreviated as PEG) having a hydroxyl terminal group at both ends is used as the polyether based segment.

For commercial PEG products, the number average molecular weight of a PEG with a hydroxyl group at both ends is commonly calculated from hydroxyl value determined by a technique such as the neutralization method (hereinafter, the number average molecular weight of a PEG is denoted as $M_{PEG}$). A substantially PLA-PEG-PLA type block copolymer (PLA denotes polylactic acid) can be produced by preparing a mixture by adding $w_L$ parts by mass of a lactide to $w_E$ parts by mass of a PEG having a hydroxyl terminal group at both ends and carrying out polymerization thoroughly through ring opening reaction of lactide molecules and their addition to the hydroxyl terminal groups at both ends of the PEG molecules. This reaction is carried out in the presence of a catalyst such as tin octylate as required. The number average molecular weight of a polylactic acid segment in this block copolymer plasticizer can be substantially calculated as $(\frac{1}{2}) \times (w_L/w_E) \times M_{PEG}$. The mass content of the polylactic acid segment component in the entire block copolymer plasticizer is substantially determined as $100 \times w_L/(w_L+w_E)$ (%). The mass content of the plasticizer components excluding the polylactic acid segment component in the entire block copolymer plasticizer is substantially determined as $100 \times w_E/(w_L+w_E)$ (%).

The objectives of adding resin (B) other than improving the flexibility and the moisture permeability after processing include, depending on the type of resin, stabilization of bubble formation during film production by inflation molding, in particular, resulting from improved melt viscosity and melt tension, improvement in high-temperature rigidity of the polylactic acid based film due to the presence of poly (meth) acrylate, improvement in impact resistance and ductility of the polylactic acid based film due to the presence of a polyester, and promotion of biodegradation of the polylactic acid based film due to the presence of a starch-containing polymer.

It is important for resin (B) contained in the composition to form a polylactic acid based film to account for 5 to 90 mass % assuming that resin (A) and resin (B) account for 100 mass % in total. The flexibility will not be sufficiently high if the content is less than 5 mass % while the heat resistance and bleed-out resistance will not be sufficiently high if the content is more than 90 mass %. Resin (B) preferably accounts for 10 to 80 mass %, more preferably 15 to 70 mass %, still more preferably 20 to 60 mass %, assuming that resin (A) and resin (B) account for 100 mass % in total.

Combination of Resins for Resin (B)

The polylactic acid based film may contain only one of these resins for resin (B) or may contain more of them in combination. There are no specific limitations on the resins to be combined, and appropriate ones in the group of thermoplastic resins other than polylactic acid based resins given above for use as resin (B) may be combined. Among others, the combination of various resin based plasticizers and thermoplastic resins other than resin based plasticizer is preferable from the viewpoint of maintaining both a high flexibility and a moisture permeability after processing. In particular, we found that the moisture permeability after processing is dramatically improved when a combination of various resin based plasticizers and thermoplastic resins other than resin based plasticizer is used as resin (B).

Of the various resin based plasticizers, it is preferable to use a block copolymer plasticizer as mentioned above, i.e., either a block copolymer having a polyether based segment and a polylactic acid segment or a block copolymer having a polyester based segment and a polylactic acid segment, from the viewpoint of heat resistance, moisture permeability after processing, and bleed-out resistance. It is more preferable to use a block copolymer containing a polyether based segment and a polylactic acid segment.

Of the thermoplastic resins other than resin based plasticizers, aliphatic polyester based resins and aliphatic-aromatic polyester based resins are preferable from the viewpoint of biodegradability. More preferable aliphatic polyester based resins include polyglycolic acid, poly(3-hydroxybutyrate), poly(3-hydroxybutyrate-3-hydroxyvalerate), poly(3-hydroxybutyrate-3-hydroxyhexanoate), polycaprolactone, polybutylene succinate, and poly(butylene succinate-adipate), and more preferable aliphatic-aromatic polyester based resins include poly(ethylene succinate-terephthalate), poly(butylene succinate-terephthalate), and poly(butylene adipate-terephthalate). Of these, poly(3-hydroxybutyrate-3-hydroxyhexanoate), poly(butylene succinate-adipate), and poly(butylene adipate-terephthalate) are particularly preferable.

Thus, it is preferable that resin (B) be at least one resin selected from the group consisting of block copolymers each having a polyether based segment and a polylactic acid segment, block copolymers each having a polyester based segment and a polylactic acid segment, aliphatic polyester based resins, and aliphatic-aromatic polyester based resins, and it is more preferable that resin (B) be a combination of at least one resin (resin based plasticizer) selected from the group consisting of block copolymer each having a polyether based segment and a polylactic acid segment, and block copolymers each having a polyester based segment and a polylactic acid segment, with at least one resin (thermoplastic resin other than resin based plasticizer) selected from the group consisting of aliphatic polyester based resins and aliphatic-aromatic polyester based resins.

When resin (B) contained in polylactic acid based film is a combination of one of various resin based plasticizers and a thermoplastic resin other than resin based plasticizer, the compounding ratio by mass, which is represented as (various resin based plasticizers/thermoplastic resin other than resin based plasticizer), is preferably (5/95) to (95/5), more preferably (10/90) to (80/20), still more preferably (20/80) to (60/40).
Mixing of crystalline polylactic acid based resin and amorphous polylactic acid based resin It is important that resin (A) (polylactic acid based resin) contained in a composition to form a polylactic acid based film be a mixture of a crystalline polylactic acid based resin and an amorphous polylactic acid based resin. This means that it is important for resin (A) (polylactic acid based resin) to contain both a crystalline polylactic acid based resin and an amorphous polylactic acid based resin. This is because the use of a mixture of a crystalline polylactic acid based resin and an amorphous polylactic acid based resin as resin (A) (polylactic acid based resin) can combine the advantages of crystalline and amorphous polylactic acid based resins.

As described previously, a crystalline polylactic acid based resin as referred to here is a polylactic acid based resin having a melting point attributed to a polylactic acid component that is determined by subjecting the polylactic acid resin to differential scanning calorimetry (DSC) in an appropriate temperature range after heating it to ensure adequate crystallization.

An amorphous polylactic acid based resin as referred to here, on the other hand, is a polylactic acid based resin that does not show a distinct melting point when subjected to the same measuring procedure.

The film will be lacking in heat resistance if the polylactic acid based resin used as resin (A) does not containing a crystalline polylactic acid based resin. If a block copolymer plasticizer is used as one of various plasticizers as mentioned above, the absence of crystalline polylactic acid based resin in resin (A) prevents it from forming eutectic crystals with the polylactic acid segment of the block copolymer plasticizer, resulting in a lack of bleed-out resistance.

On the other hand, the film will be lacking in flexibility in bleed-out resistance if the polylactic acid based resin used as resin (A) does not containing a amorphous polylactic acid based resin. This is a result of the absence of an amorphous region where the plasticizer can disperse.

In the crystalline polylactic acid based resin used to form a polylactic acid based film, the L-lactic acid units in a poly-L-lactic acid or the D-lactic acid units in a poly-D-lactic acid preferably account for 96 to 100 mol %, more preferably 98 to 100 mol %, of the total lactic acid units, which account for 100 mol %, from the viewpoint of improving heat resistance and blocking resistance.

Assuming that resin (A) in a composition to form a polylactic acid based film account for 100 mass % (or, assuming that the total quantity of the crystalline polylactic acid based resin and the amorphous polylactic acid based resin accounts for 100 mass %), it is preferable that the crystalline polylactic acid based resin accounts for 5 to 60 mass %, more preferably 10 to 50 mass %, and still more preferably 20 to 40 mass %.
Filler (C)

It is important for polylactic acid based film to be one produced from a composition containing, as filler (C), a compound treated with a surface treatment agent to ensure improved moisture permeability after processing. An inorganic filler and/or organic filler can be used as a precursor for filler (C) that is untreated with a surface treatment agent.

"Inorganic filler and/or organic filler" refers to a substance to be added as a base material to develop specific characteristics or an inactive substance (inactive inorganic compound and/or organic compound) to be added for a specific purpose such as increasing the weight, increasing the volume, and reducing the product price.

Useful inorganic fillers include various carbonates such as calcium carbonate, magnesium carbonate, and barium carbonate; various sulfates such as magnesium sulfate, barium sulfate, and calcium sulfate; various oxides such as zinc oxide, silicon oxide (silica), zirconium oxide, magnesium oxide, oxidized calcium, titanium oxide, magnesium oxide, iron oxide, alumina; hydroxides such as aluminum hydroxide and magnesium hydroxide; various composite oxides such as silicate mineral, hydroxyapatite, mica, talc, kaolin, clay, and montmorillonite, zeolite, metal-ion-carrying zeolite, wollastonite, potassium titanate, aluminum borate, and sepiolite; various phosphates such as lithium phosphate, calcium phosphate, and magnesium phosphate; various salts such as lithium chloride and lithium fluoride; and other such as boron nitride, potassium titanate, metal phthalocyanine, activated carbon, bamboo charcoal, carbon black, carbon fiber, carbon nanotube, fullerene, and graphite.

Useful organic fillers include oxalic acid salt such as calcium oxalate; terephthalates such as of calcium, barium, zinc, manganese, and magnesium; fine particles of a homopolymer or a copolymer produced from vinyl based monomers such as such as divinylbenzene, styrene, acrylic acid, and methacrylic acid; organic fine particles of polytetrafluoroethylene, benzoguanamine resin, thermosetting epoxy resin, unsaturated polyester resin, thermosetting urea resin, and thermosetting phenol resin; cellulose based powders such as wood powder and pulp powder; chip-like materials such as hulls, wood chips, bean curd refuse, ground waste paper, and ground clothing; vegetable fibers such as cotton fiber, hemp fiber, bamboo fiber, wood fiber, kenaf fiber, jute fiber, banana fiber, and coconut fiber, animal fibers such as silk, wool, angora, cashmere, and camel, and synthetic fibers such as polyester fiber, nylon fiber, and acrylic fiber.

Of the aforementioned precursors for filler (C), i.e., compounds untreated with a surface treatment agent (inorganic fillers and/or organic fillers), those able to develop different characteristics other than moisture permeability after processing include silicon oxide (silica), talc, and calcium carbonate, which work as fillers to develop blocking resistance; aluminum hydroxide and magnesium hydroxide, which work as fillers to develop fire retardance; zinc oxide and titanium oxide, which work as fillers to develop ultraviolet ray absorbability; zeolite, zeolite carrying metal ion (such as silver ion), zinc oxide, titanium oxide, and metal phthalocyanine, which work as fillers to develop antimicrobial property; and zeolite, zeolite carrying metal ion (such as silver ion), activated carbon, bamboo charcoal, and sepiolite, which work as fillers to develop deodorization ability. Specific products of zeolite carrying metal ion (such as silver ion) that can develop antimicrobial property and deodorization ability include the Zeomic Series supplied by Sinanen Zeomic Co., Ltd.

Of these precursors for filler (C), i.e., compounds untreated with a surface treatment agent (inorganic fillers and/or organic fillers), calcium carbonate, barium carbonate, barium sulfate, calcium sulfate, silicon oxide (silica), titanium oxide, mica, talc, kaolin, clay, and montmorillonite are preferable from the viewpoint of improving moisture permeability after film processing, maintaining mechanical characteristics such as strength and elongation percentage, and reducing the costs.

Filler (C) can be produced by treating the aforementioned inorganic fillers and/or organic fillers with a surface treatment agent. Surface treatment agents usable for the surface treatment to produce filler (C) include phosphate based compounds, fatty acids, resin acid, interfacial active agents, fat and oil, wax, carboxylic acid based coupling agents, silane coupling agents, titanate coupling agents, and polymer based surface treatment agents. The use, as filler (C), of one of these compounds treated with a surface treatment agent serves to improve the affinity with the matrix resin, suppress the coagulation of the filler, and improve its dispersibility, allowing the filler to be dispersed uniformly in a resin composition. As a result, it becomes possible to produce a film having high processability such as for stretching and embossing, required to develop high moisture permeability.

There are no specific limitations on the surface treatment method, and usable ones include physical mixing of a surface treatment agent and a compound untreated with a surface treatment agent (inorganic filler and/or organic filler) as well as their mixing in a solvent such as toluene. Of these, physical mixing is preferable from a practical point of view. There are no specific limitations on the method to be used for physical mixing, and usable ones include crushing a material untreated with a surface treatment agent with one of various crushing machines such as, for instance, roll tumbling mill, high speed rotary crusher, ball mill, and jet mill while simultaneously performing surface treatment with an surface treatment agent; and carrying out surface treatment using a revolving container type mixer, in which the container itself revolves, a fixed container equipped with a rotating blade, or a fixed container type mixer into which an air jet is blown. Specifically, preferable mixers include Nautamixer, ribbon mixer, and Henschel mixer.

There are no specific limitations on the treatment conditions for carrying out the operation, and if filler (C) is added to and mixed with a matrix resin (resin (A) and resin (B)), the treatment temperature is preferably 30° C. or more, more preferably 50° C. or more, and particularly preferably 90° C. or more, from the viewpoint of the dispersibility of filler (C) in the matrix resin (resin (A) and resin (B)) and foreign object generation and foaming during high temperature retention of the matrix resin (resin (A) and resin (B)). The treatment time is preferably 5 hours or less, more preferably 3 hours or less, and particularly preferably 2 hours or less.

It is preferable that filler (C) be produced by subjecting an inorganic filler and/or organic filler to treatment with a surface treatment agent and that the specific surface area S (m$^2$/g) of the inorganic filler and/or organic filler and the percentage by mass T (mass %) of that portion of filler (C) originating from the surface treatment agent meet the requirement given below:

$$0.15 \leq T/S \leq 0.45.$$

The aforementioned effect of the surface treatment agent will be maximized when T/S is 0.15 or more. The value of T/S is more preferably 0.20 or more, still more preferably 0.25 or more. A value of T/S of 0.45 or less is preferable because this serves to suppress degradation such as hydrolysis and oxidative decomposition of the matrix resin (resin (A) and resin (B)) that may be caused by an excess surface treatment agent, leading to improved durability. The value of T/S is more preferably 0.40 or less.

If a phosphate based compound is to be used as a surface treatment agent, the phosphate based compound may be a phosphate ester, phosphite ester, or pyrophosphate ester. It may contain two or more phosphorus atoms in one molecule, and in some cases, it is preferable that an unsaturated bond is contained in the molecule and that the unsaturated bond be a double bond located at a molecular end.

If a fatty acid is to be used as a surface treatment agent, the fatty acid may be a saturated fatty acid such as stearate, or an unsaturated fatty acid such as oleic acid and linoleic acid.

Usable resin acids include a resin having a carboxyl group at a molecular end or in the backbone chain such as maleic acid modified polyolefin.

If an interfacial active agent is to be used as a surface treatment agent, the interfacial active agent may be an anionic surface active agent such as stearic acid soap and sulfonic acid soap, or a nonionic surface active agent such as polyethylene glycol derivatives.

If a fat or oil is to be used as a surface treatment agent, the fat or oil may be, for instance, soybean oil or linseed oil.

If a wax is to be used as a surface treatment agent, the wax may be carnauba wax, long chain ester wax, polyethylene wax, polypropylene wax, oxide thereof or acid-modified product thereof If a carboxylic acid based coupling agent is to be used as a surface treatment agent, the carboxylic acid based coupling agent may be a carboxylated polybutadiene or carboxylated polyisoprene.

If a silane coupling agent is to be used as a surface treatment agent, the silane coupling agent may be a vinyl trimethoxysilane, γ-glycidoxy propyl trimethoxysilane, γ-methacryloxy propyl trimethoxysilane, γ-aminopropyl trimethoxysilane, N-β(aminoethyl) γ-aminopropyl trimethoxysilane, N-phenyl-γ-aminopropyl trimethoxysilane, or γ-mercaptopropyl trimethoxysilane.

If a titanate coupling agent is to be used as a surface treatment agent, the titanate coupling agent may be one having an organic functional group of an "alkyl group+amino group" type, phosphite type, pyrophosphate type, or carboxylic acid type.

If a polymer based surface treatment agent is to be used as a surface treatment agent, the polymer based surface treatment agent may be a random or graft copolymer such as maleic-anhydride-modified polyolefin; maleic-anhydride-modified styrene-ethylene-butadiene-styrene copolymer; block copolymer such as propylene-acrylate; or hydrophobic group-hydrophilic group copolymer.

Of these, the surface treatment agent to be used as filler (C) is preferably at least one compound selected from the group consisting of a phosphate based compound, fatty acid, resin acid, interfacial active agent, silane coupling agent, and titanate coupling agent. Of these, the surface treatment agent to be used for filler (C) is preferably a phosphate based compound and/or fatty acid.

If at least either an aliphatic polyester based resin or an aliphatic-aromatic polyester based resin is used as a thermoplastic resin other than polylactic acid based resin for resin (B), the surface treatment agent used for filler (C) is preferably a phosphate based compound from the viewpoint of improving the affinity with the matrix resin (combination of resin (A) and resin (B)).

Furthermore, the surface treatment agent used to prepare filler (C) preferably contains a methacrylate group. This is because the high affinity between the methacrylate group and the polylactic acid in the matrix resin serves more effectively for suppressing the coagulation of the filler and improving its dispersibility, allowing the filler to be dispersed more uniformly in the resin composition. As a result, it becomes possible to produce a film having higher processability. The methacrylate group is preferably located at a molecular end of the surface treatment agent.

It is preferable that the surface treatment agent to be used to prepare filler (C) be at least one selected from the group consisting of phosphate based compound, fatty acid, resin acid, surface active agent, silane coupling agent, and titanate coupling agent, and at the same time contain a methacrylate group. In particular, a phosphate based compound containing a methacrylate group and/or a fatty acid containing a methacrylate group are more preferable.

There are no specific limitations on the average particle diameter of filler (C), but it is preferably 0.01 to 10 μm. An average particle diameter of 0.01 μm or more allows a film to contain filler (C) at a high content, resulting in a film that has the potential of being improved in moisture permeability, while an average particle diameter of 10 μm or less allows a film to have a high processability such as for stretching and embossing, resulting in a film that has the potential of being improved in moisture permeability. The average particle diameter of filler (C) is more preferably 0.1 to 8 μm, still more preferably 0.5 to 5 μm, and most preferably 1 to 3 μm. The average particle diameter referred to herein is a D50 diameter (median diameter of particle diameter distribution) determined by laser diffractometry.

It is important that the content of filler (C) in a composition to form a film be 10 to 400 parts by mass relative to the total mass of resin (A) and resin (B), which accounts for 100 parts by mass. The film will not have a sufficiently high potential of being improved in moisture permeability if it is less than 10 parts by mass, while the film will deteriorate in processability such as for stretching and embossing as well as melt processability during its production if it is more than 400 parts by mass. The content of filler (C) in a composition to form a film is preferably 20 to 300 parts by mass, more preferably 30 to 200 parts by mass, still more preferably 40 to 150 parts by mass, and particularly preferably 50 to 100 parts by mass, relative to the total mass of resin (A) and resin (B), which accounts for 100 parts by mass.

Crystal Nucleating Agent

The polylactic acid based film may contain a crystal nucleating agent to improve the heat resistance and tear resistance of the film.

Preferable organic crystal nucleating agents include aliphatic amide compound, melamine based compound, metallic phenylphosphonate, benzenecarbamide derivative, aliphatic/aromatic carboxylic acid hydrazide, sorbitol based compound, amino acid, and polypeptide.

Preferable inorganic crystal nucleating agents include carbon black and talc.

The content of the crystal nucleating agent in a composition to form a film preferably 0.1 to 10 parts by mass, more preferably 0.5 to 5 parts by mass, relative to the total mass of resin (A) and resin (B), which accounts for 100 parts by mass.

Tensile Elongation Percentage

It is preferable that the polylactic acid based film has a tensile elongation percentage of 50% or more and 500% or less. A tensile elongation percentage of 50% or more is preferable, because film breakage and defects (hole formation) will not occur significantly during film production and a film can be produced smoothly when the tensile elongation percentage is 50% or more. A tensile elongation percentage of 150% or more is more preferable, because processability such as for stretching and embossing will also be high when the tensile elongation percentage is 150% or more. The tensile elongation percentage is still more preferably 200% or more. The processability is high if the elongation percentage is 50% or more, while if the tensile elongation percentage is 500% or less, serious sagging and creases will not occur when the film is travelling between rollers or being wound up during the film production process, thus leading to a roll having a good appearance and high unwinding performance. Accordingly, it is preferable that the tensile elongation percentage be 500% or less.

A tensile elongation percentage of 50 to 500% can be achieved by adjusting the contents of resin (A), resin (B), and filler (C) in a composition to form a film to the aforementioned respective preferable ranges or maintaining a good relationship among the type and mass proportion of the surface treatment agent used for filler (C) and the specific surface area of the filler to meet the aforementioned requirements.

Tensile Elastic Modulus

To have an adequate flexibility, the polylactic acid based film preferably has a tensile elastic modulus of 100 to 1,500 MPa in both the length direction and the width direction. The tensile elastic modulus is more preferably 150 to 1,200 MPa, still more preferably 200 to 1,000 MPa.

A method to maintain a tensile elastic modulus of 100 to 1,500 MPa in both the length direction and the width direction is adjusting the contents of resin (A), resin (B), and filler (C) to the aforementioned respective preferable ranges.

Thickness

It is preferable that the polylactic acid based film has a film thickness of 5 to 300 μm. Maintaining a film thickness of 5 μm or more ensures that the resulting film will have high a high processability such as for stretching and embossing, as well as high bending strength, high handleability, good roll appearance, and good unwinding properties. If the film thickness is 300 μm or less, the resulting film will be high in flexibility and also high in moisture permeability after processing, and in particular, destabilization of bubbles will be prevented by the film's own weight when produced by inflation molding. The film thickness is more preferably 7 to 200 μm, still more preferably 10 to 100 μm, and still more preferably 12 to 50 μm.

Degree of Heat Shrinkage

The polylactic acid based film preferably has a heat shrinkage degree of −5 to 5% in both the length direction and the width direction after being treated at 65° C. for 30 min. If this is 5% or less, the variation with time in the length-directional shrinkage of the wound-up film, which gives rise to deterioration in roll appearance due to so-called "roll shrinkage," can be depressed. This also prevents blocking from taking place due to excessively strong winding up. If the degree is −5% or more, the variation with time in the length-directional shrinkage of the wound-up film, which gives rise to deterioration in roll appearance, can be depressed. A heat shrinkage degree of a value less than zero (a negative value) means that the film is stretched.

Organic Lubricant

The composition to constitute the polylactic acid based film preferably contains an organic lubricant accounting for 0.1 to 5 mass % of the entire 100 mass % of the composition. In such a case, it is possible to prevent blocking from taking place in the film after being wound up. If the process for producing a polylactic acid based film contains a step of pelletizing a composition, followed by drying, re-melt-kneading, and extrusion for film production, as described below, blocking among pellets will be prevented to ensure high handleability.

Effective organic lubricants include, for instance, aliphatic hydrocarbon based ones such as liquid paraffin, natural paraffin, synthetic paraffin, and polyethylene; fatty acid based ones such as stearate, lauryl acid, hydroxystearate, and hardened castor oil; fatty amide based ones such as stearic amide, oleic amide, erucamide, lauric amide, ethylene bisstearic amide, ethylene bisoleic amide, and ethylene bislauric amide; fatty acid metal salts such as aluminum stearate, lead stearate, calcium stearate, and magnesium stearate; ones based on fatty acid (partial) esters of polyhydric alcohol such as glycerin fatty acid ester and sorbitan fatty acid ester; and long-chain fatty acid ester based ones such as stearate butyl ester, montan wax, and other long-chain ester wax. In particular, fatty acid amide based organic lubricants are preferable because they are moderately compatible with polylactic acid and accordingly can be effective in small amounts. In particular, organic lubricants with a relatively high melting point such as ethylene bis-stearamide, ethylene bis-oleamide, and ethylene bis-lauramide are preferable from the viewpoint of developing high blocking resistance.

Additives

The composition to constitute a polylactic acid based film may contain additives other than those described above as long as they do not impair the effect of our film. Useful examples include, for instance, generally known plasticizers, antioxidants, dispersants, ultraviolet ray stabilization agents, color protection agents, delustering agents, antibacterial agents, deodorants, flame retardants, weathering agents, antistatic agents, antioxidants, ion exchange agents, tackifiers, antifoaming agents, color pigments, and dyes.

Useful plasticizers include acetyl citrate based ones, phthalate based ones, aliphatic dibasic acid ester based ones, phosphate based ones, polyvalent hydroxycarboxylic acid ester based ones, fatty acid ester based ones, polyhydric alcohol ester based ones, epoxy based ones, polyester based ones, polyalkylene ether based ones, ether ester based ones, acrylate based ones.

Typical antioxidants include hindered phenolic ones and hindered amine based ones.

Dispersants may be added to further improve the dispersibility of filler (C) in a resin composition, and aliphatic acids may be used.

Carboxyl Terminal Group

When the polylactic acid based film is applied to uses such as packaging of various industry products, that do not require biodegradability or commonly require durability for long-term storage, it is preferable that the carboxyl terminal groups in the film account for 30 equivalents/$10^3$ kg or less, more preferably 20 equivalents/$10^3$ kg or less, and still more preferably 10 equivalents/$10^3$ kg or less, to develop a high durability by depressing the strength deterioration of polyester based resins, used as resin (A) (polylactic acid based resin) and resin (B), that may be caused by hydrolysis. If the carboxyl terminal groups in the film account for 30 equivalents/$10^3$ kg or less, the quantity of carboxyl end groups, which can act as autocatalyst for hydrolysis, is maintained at an adequately low level, making it possible to developing a practically high durability in many cases, depending on the intended uses.

The methods available to maintain the quantity of carboxyl terminal groups in the film at 30 equivalents/$10^3$ kg or less include, for instance, the method of controlling it by using an appropriate catalyst and heat history or removing oligomers during the synthesis of the polyester based resins used as resin (A) (polylactic acid based resin) and resin (B), the method of reducing the moisture content in the resin to be used for film production, decreasing the extrusion temperature, shortening the retention time, relaxing the heat history, or removing oligomers during the film production process, and the method of using a reactive compound to cap the carboxyl terminal groups. Of these, the use of a reactive compound is preferable. It is preferable that the polylactic acid based film be produced from a composition prepared by reacting a reactive compound with resin (A) and/or resin (B).

If a reactive compound is used to cap the carboxyl terminal group, it is preferable that at least part of the carboxyl terminal groups in the film are capped, and it is more preferable that all of them are capped. The usable reactive compounds include, for instance, condensation-reactive compounds such as aliphatic alcohols and amide compounds, and addition-reactive compounds such as carbodiimide compounds, epoxy compounds, and oxazoline compounds, of which addition-reactive compounds are preferable because unnecessary by-products will not be formed in large amounts during the reaction, and in particular, carbodiimide compounds and epoxy compounds are highly preferable from the viewpoint of reaction efficiency.

The carbodiimide compound is defined as a compound having at least one carbodiimide group represented as —N═C═N— in one molecule, and its commercial products include Carbodilite series supplied by Nisshinbo Industries, Inc., and Stabaxol series supplied by Rhein Chemie.

Usable epoxy compounds include glycidyl ether compounds, glycidyl ester compounds, glycidyl amine compounds, glycidyl imide compounds, glycidyl (meth)acrylate compounds, and alicyclic epoxy compounds. Their commercial products include Joncryl series (glycidyl-containing acrylic/styrene based copolymers) supplied by BASF, Rezeda series and Arufon series (glycidyl-containing acrylic based resins) supplied by Toagosei Co., Ltd., and Tepic series (epoxy compound containing triazine backbone) supplied by Nissan Chemical Industries, Ltd.

The content of a reactive compound in the polylactic acid based film is preferably 0.01 to 10 parts by mass, more preferably 0.05 to 5 parts by mass, still more preferably 0.1 to 3 parts by mass, and particularly preferably 0.5 to 2 parts by mass, particularly preferably, relative to the total mass of resin (A) and resin (B), which accounts for 100 parts by mass.

In particular, we found that a film having both high processability and high durability can be produced by controlling the specific surface area S (m2/g) of the inorganic filler and/or organic filler used and the percentage by mass T (mass %) of that portion of the aforementioned filler (C) originating from the surface treatment agent to stay in preferred ranges and in addition, using a composition prepared by reacting a reactive compound with resin (A) and/or resin (B) to produce a film.

Content of Lactic Acid Oligomer Components

In the polylactic acid based film, the content of the lactic acid oligomer components contained in the film is preferably 0.3 mass % or less. It is more preferably 0.2 mass % or less, and more preferably 0.1 mass % or less. If the content of the lactic acid oligomer components contained in the film is 0.3 mass % or less, it is possible to depress the deterioration in handleability taking place as lactic acid oligomer components remaining in the film precipitate in the form of powder or liquid, prevent the degradation of the film over time through depression of hydrolysis of the polylactic acid based resin, and depress characteristic odors of polylactic acid. A lactic acid oligomer component as referred to herein is a cyclic dimer (lactide) of lactic acid that accounts for the largest part in the lactic acid, linear oligomers and cyclic oligomers of lactic acid existing in the film, namely, LL-lactide, DD-lactide, or DL(meso)-lactide. Methods for adjusting the content of the lactic acid oligomer components contained in the film to 0.3 mass % or less will be described later.

Production Method

In the next place, the polylactic acid based film production method is described in detail, but it should be understood that this disclosure is not construed as being limited thereto.

A polylactic acid based resin to be used as resin (A) can be produced by, for instance, a process as described below. A material formed of either L-lactic acid or D-lactic acid as primary lactic acid component may be used as starting material, and a hydroxycarboxylic acid other than the aforementioned lactic acid component may be used in combination. A cyclic ester intermediate of a hydroxycarboxylic acid such as lactide and glycolide may also be used as a starting material. Dicarboxylic acids and glycols may also be usable.

A polylactic acid based resin can be produced by direct dehydration and condensation of a starting material as given above, or ring opening polymerization of a cyclic ester intermediate as given above. In the case where direct dehydration and condensation, for instance, are carried out for production, a high-molecular weight polymer is obtained by performing azeotropic dehydration and condensation of lactic acid or a mixture of lactic acid and a hydroxycarboxylic acid preferably in the presence of an organic solvent, particularly a phenyl ether based solvent, or particularly preferably by removing water from the solvent distilled out from the azeotropic step to provide a virtually water-free solvent, followed by feeding it back to the reaction system for polymerization.

It is also known that a high-molecular weight polymer can be produced also by subjecting a cyclic ester intermediate such as lactide to ring opening polymerization under reduced pressure using a catalyst such as tin octylate. A polymer with a smaller lactide content can be produced by, for instance, the following methods: the method of controlling the conditions for removal of water and low molecule compounds in the organic solvent during heated reflux, the method of deactivating the catalyst after completion of the polymerization reaction to depress depolymerization, and the method of heat-treating the resulting polymer.

A composition to be used to constitute the polylactic acid based film namely, a composition containing resin (A) (polylactic acid based resin), resin (B) (a thermoplastic resin other than polylactic acid based resin), and filler (C), as well as other components such as organic lubricant that are added as required, can be produced by dissolving these components in a solvent, mixing them uniformly, and then removing the solvent to separate a composition, but the use of a melt-kneading process in which a composition is produced by melt-kneading the components is preferable because this method is practical in that it does not require steps for dissolving the starting materials in a solvent and subsequently removing the solvent. There are no specific limitations on the melt-kneading method, and commonly-used generally-known mixers including kneader, roll mill, Banbury mixer, and uniaxial or twin screw extruder may be used. In particular, it is preferable to use a twin screw extruder from the viewpoint of dispersibility of resin (A), resin (B), and filler (C).

Melt-kneading is performed preferably in the temperature range of 150° C. to 240° C., more preferably in the range of 190° C. to 210° C. from the viewpoint of preventing degradation of the lactic acid based resin.

The polylactic acid based film can be produced from a composition prepared as described above, by existing film production methods such as the generally known inflation molding method, tubular method, and T-die cast method.

When the polylactic acid based film is produced by, for instance, pelletizing a composition as prepared by the method described above, followed by re-melt-kneading, and extrusion for film production, it is preferable to dry the pellets at 60 to 100° C. for 6 hours or more to reduce the water content in the composition to 500 ppm or less, preferably 200 ppm or less. It is preferable, furthermore, to vacuum-dry them in a high-degree vacuum with a degree of vacuum of 10 Torr or less to reduce the content of the lactic acid oligomer component in the composition that contains the polylactic acid based resin and other components. This is preferable also because a decrease in the water content in the composition that contains the polylactic acid based resin and other components to 500 ppm or less and a decrease in the content of the lactic acid oligomer component serve to prevent hydrolysis from taking place during the melt-kneading step and thereby prevent a decrease in molecular weight, thus serving to maintain a melt viscosity at a moderate level and stabilizing the film production process. From a similar point of view, it is preferable to use a vacuum vent type twin screw extruder for pelletizing of the composition or melt-extrusion/film production and perform melt-extrusion while removing water and volatile components such as low molecular weight substances.

To produce the polylactic acid based film by inflation molding, the following method, for instance, can be used. An intended porous film can be produced by melt-extruding pellets of a composition prepared as described above from a vent type twin screw extruder, supplying the melt to a ring die, extruding it from the ring die, supplying dry air into it to form a balloon (bubble) like structure, then uniformly air-cooling and solidifying it by using an air ring, and folding it flat by nip rolls as it is taken up at a specified take-up speed, followed by cutting open either or both ends as necessary and winding up.

When melt-extruding a composition to form the polylactic acid based film, the cylinder temperature is commonly maintained at 150 to 240° C. and the temperature of the ring die is controlled preferably at 150 to 190° C., more preferably 150 to 180° C.

It is preferable to use a spiral-type ring die from the viewpoint of thickness accuracy and uniformity.

Other various surface treatments may be performed after film formation to improve printing properties, lamination suitability, coating suitability, and the like. Available surface treatment methods include corona discharge treatment, plasma treatment, flame treatment, and acid treatment, and any of them can be used effectively, but corona discharge treatment is the most preferable because it can be performed continuously, needs only simple equipment that can be added easily to conventional film production facilities, and can be performed by simple operations.

The polylactic acid based film is high in bleed resistance and blocking resistance and, accordingly, the film wound up in a roll can be unwound smoothly without troubles.

To produce the polylactic acid based film by inflation molding, it is important to control the blow ratio and the draw ratio in preferable ranges to obtain a film having a high processability such as for stretching and embossing. The bow ratio is the ratio RL/RO where RL and RO denote the final radius of the bubble and the radius of the ring die, respectively, while the draw ratio is the ratio VL/VO where VL and VO denote the wind-up speed of the formed film and the discharge speed of molten resin from the die lip, respectively. The bow ratio is preferably 1.5 to 4.0, more preferably 1.7 to 3.5, and still more preferably 2.0 to 3.0. The draw ratio is preferably 2 to 80, more preferably 4 to 70, still more preferably 5 to 60, and particularly preferably 6 to 50.

Processing Method

Processing methods including stretching and embossing that serve to allow the polylactic acid based film to have a high moisture permeability are described in detail below, but it should be understood that this disclosure is not construed as being limited thereto.

To stretch the polylactic acid based film, it is heated while being conveyed on rollers maintained at 50 to 90° C., and stretched in the film's length direction by virtue of differences in circumferential speed among the rollers. The film thus uniaxially stretched is first cooled, introduced into a tenter heated at 55 to 95° C., with the ends of the film held by clamps, and stretched in the width direction. Then, this stretched film is heat-treated at 90 to 150° C. for 0.2 to 30 sec under tension or while being relaxed in the width direction. The relaxation is carried out to a degree of 1 to 10% to reduce the heat shrinkage degree in the width direction. The film may be stretched uniaxially in either the longitudinal or the transverse direction, or biaxially in both the longitudinal and the transverse directions.

Embossing is carried out by passing the polylactic acid based film between an embossing roller having a rough surface heated at 20 to 80° C. and a nip roller made of rubber.

Second Polylactic Acid Based Film

Our second version of polylactic acid based film is characterized in that it contains a polylactic acid based resin as resin (A) and also contains 10 to 400 parts by mass filler (C) and/or filler (D) relative to 100 parts by mass of the resin, that filler (C) is a compound treated with a surface treatment agent, that filler (D) is an inorganic filler and/or organic filler untreated with a surface treatment agent, and that the tensile elongation percentage is 150 to 500%.

The second polylactic acid based film is the same as the first polylactic acid based film except for the features described below. Thus, the features of the second film concerning resin (A) (polylactic acid based resin), filler (C), and tensile elongation percentage are as described above for the first film.

Filler (D)

Filler (D) for the second film is a precursor of filler (C), which is described in paragraph (Filler (C)) and, specifically, it is an inorganic filler and/or organic filler that has not undergone such a treatment with an surface treatment agent as performed for filler (C).

It is important that the content of filler (C) and/or filler (D) in a composition to form a film be 10 to 400 parts by mass relative to the total mass of resin, which accounts for 100 parts by mass. The film will not have a sufficiently high potential of being improved in moisture permeability if it is less than 10 parts by mass, while the film will deteriorate in processability such as for stretching and embossing as well as melt processability during its production if it is more than 400 parts by mass. The content of filler (C) and/or filler (D) in a composition to form a film is preferably 20 to 300 parts by mass, more preferably 30 to 200 parts by mass, still more preferably 40 to 150 parts by mass, and particularly preferably 50 to 100 parts by mass, relative to the total mass of resin, which accounts for 100 parts by mass.

Tensile Elongation Percentage

It is important for the polylactic acid based second film to have an average tensile elongation percentage between the length direction and the width direction (the direction perpendicular to the length direction) of 150% or more and 500% or less. Processability such as for stretching and embossing will deteriorate if the average tensile elongation percentage is less than 150%. If the tensile elongation percentage is more than 500%, sagging and creases will occur frequently when the film is travelling between rollers or being wound up during the film production process, thus leading to deterioration in roll appearance and unwinding performance. The average tensile elongation percentage between the length direction and the width direction is more preferably 200% or more and 500% or less and still more preferably 250% or more and 500% or less.

An average tensile elongation percentage between the length direction and the width direction of 150 to 500% can be achieved by adjusting the content of filler (C) and/or filler (D) in the resin constituting the film to the aforementioned preferable range or maintaining a blow ratio and draw ratio in the aforementioned preferred ranges during the inflation molding step for film production.

Resin (A)

For polylactic acid based second film, resin (A) may not necessarily be a mixture of a crystalline polylactic acid based resin and amorphous polylactic acid based resin, but may be only a crystalline polylactic acid based resin or an amorphous polylactic acid based resin as long as the aforementioned requirements for tensile elongation are met.

EXAMPLES

Our films and methods will be illustrated below in greater detail with reference to Examples, but it should be understood that this disclosure is not construed as being limited thereto.

Measurement and Evaluation Methods

Measurements and evaluations described in Examples were carried out under the following conditions.

(1) Tensile Modulus (MPa)

Tensilon UCT-100 supplied by Orientec Co., Ltd., was used in an atmosphere of room temperature of 23° C. and a relative humidity of 65% for tensile modulus determination.

Specifically, strip specimens with a length of 150 mm in the measuring direction and a width of 10 mm were cut out, and 10 measurements were made in both the length direction and the width direction with an initial tensile chuck distance of 50 mm and a tension speed of 200 mm/min according to the method specified in JIS K-7127 (1999), followed by averaging them to represent their tensile modulus in the length direction and that in the width direction.

(2) Heat Resistance

A crease-free film for evaluation was pasted in a taut state on an aluminum frame with an inner size of 150 mm×150 mm and then the film was fixed to the frame using several binder clips for stationery use, left to stand for 5 min in a hot-air oven maintained at a constant temperature, and then taken out for observation of the state of the film. The test was carried out repeatedly with the temperature of the hot-air oven increased at intervals of 5° C. from 120° C., and the heat resistant temperature (° C.) was determined as the highest temperature at which the film was free from defects such as formation of holes and fusion bonding of the film to the frame.

Based on the measurement, evaluations were made according to the following criteria:
- ● (excellent): 160° C. or more
- ○ (good): 140° C. or more and less than 160° C.
- Δ (fair): 120° C. or more and less than 140° C.
- x (failure): less than 120° C.

(3) Bleed-Out Resistance

The mass loss rate after hot-water treatment (%) was measured as described below and used as an index to represent the bleed-out resistance. The bleed-out resistance increases with a decreasing mass loss rate.

In advance, the mass (g) of untreated film was measured (to three places of decimals) using a sample of about 0.5 g humidity-conditioned for 1 day or longer in an atmosphere at a temperature of 23° C. and a humidity of 65% RH. Then, it was treated for 30 min in distilled water at 90° C. and subsequently humidity-conditioned under the same conditions as for the untreated film, followed by measuring the mass (g) (to three places of decimals). Finally, the change in in mass (mass loss) of the treated sample was divided by the mass of the untreated sample to calculate the mass loss rate.

(4) Processability A (Tensile Elongation Percentage)

Tensilon UCT-100 supplied by Orientec Co., Ltd., was used in an atmosphere of room temperature of 23° C. and a relative humidity of 65% for determination of tensile elongation percentage.

Specifically, strip specimens with a length of 150 mm in the measuring direction and a width of 10 mm were cut out, and 10 measurements were made in both the length direction and the width direction with an initial tensile chuck distance of 50 mm and a tension speed of 200 mm/min according to the method specified in JIS K-7127 (1999), followed by averaging them to represent their tensile elongation percentage in the length direction and that in the width direction.

The average between the tensile elongation percentage in the length direction and that in the width direction was calculated, and this average was adopted as the value of tensile elongation percentage for this disclosure and used for evaluation according to the following criteria:
- ● (excellent): 150% or more
- ○ (good): 100% or more and less than 150%
- Δ (fair): 50% or more and less than 100%
- x (failure): less than 50%.

(5) Processability B

A film sample with a thickness of 100 μm, length of 100 mm, and width of 100 mm was stretched using a film stretcher KARO-IV supplied by Bruckner. A sequentially biaxially stretched film was prepared by the following stretching procedure: a sample was preheated at a temperature of 80° C. for 10 sec in a stretching chamber, stretched 3.5 times in the length direction at a temperature of 80° C. and speed of 30%/sec, subsequently stretched 3.5 times in the width direction, and finally heat-treated at a temperature of 100° C. for 10 sec in a heat treatment a chamber.

The conditions of the biaxially stretched film were observed, and evaluations were made according to the following criteria:
- ○ (good): smoothly stretchable (free of film breakage or hole formation)
- Δ (fair): stretchable (suffering from minute holes in film though free of breakage)
- x (failure): unstretchable (suffering from breakage of film, and not falling under ○ or Δ).

(6) Processability C

A film sample with a thickness of 15 μm, length of 300 mm, and width of 210 mm was subjected to emboss processing using an electric heating type embossing machine HTEM-300 supplied by Yuri Roll Co., Ltd.

Using an upper embossing roll having a pinpoint pattern, pitch of 1.8 mm, repeating unit size of 1.8 mm, depth of 0.78 mm, and roll diameter of 100 mm, and a lower rubber roll made of superhard rubber with a hardness of D-90, an embossed film was prepared under the embossing conditions of a roll temperature of 50° C., nip pressure of 100 kg/cm, and roll rotating speed 1 m/min.

The conditions of the embossed film were observed, and evaluations were made according to the following criteria:
- ○ (good): smoothly processable (free of film breakage or circular holes)
- Δ (fair): processable (suffering from circular holes in film, but free of breakage)
- x (failure): unprocessable (not falling under ○ or Δ).

(7) Moisture Permeability after Processing

Using a thermo-hygrostat set at 25° C. and 90% RH, the moisture permeability ($g/(m^2 \cdot day)$) of film specimens processed by the procedure described in paragraph (5) or (6) was measured according to the method specified in JIS Z0208 (1976).

Based on the measurement, the moisture permeability was evaluated according to the following criteria:
- ● (excellent): 1,500 $g/(m^2 \cdot day)$ or more
- ○ (good): 1,000 $g/(m^2 \cdot day)$ or more and less than 1500 $g/(m^2 \cdot day)$
- Δ (fair): 200 $g/(m^2 \cdot day)$ or more and less than 1,000 $g/(m^2 \cdot day)$
- x (failure): less than 200 $g/(m^2 \cdot day)$.

(8) Specific Surface Area S ($m^2/g$)

Using a filler untreated with a surface treatment agent (precursor of filler (C)), measurements were made according to the blaine permeability method specified in JIS R5201 (1997).

(9) Percentage by Mass T (Mass %) of the Portion of Filler (C) Originating from Surface Treatment Agent A filler untreated with a surface treatment agent (precursor of filler (C)) was fed to a Henschel mixer, which is a fixed container type mixer, and heated while being stirred at a blade rotating speed of 1,500 rpm, and when the temperature in the vessel reached 90° C., a surface treatment agent was added by spraying so that the percentage by mass of that portion of filler (C) originating from the surface treatment agent would be T (mass %). Mixing was continued for 10 min to ensure reaction. The blade rotating speed, temperature in the vessel, and mixing time may be changed appropriately depending on the types of filler and surface treatment agent used.

(10) Durability

A film specimen processed by the procedure described in paragraph (5) or (6) was pasted in a crease-free, taut state on an aluminum frame with an inner size of 150 mm×150 mm and then the film was fixed to the frame using several binder clips for stationery use, stored in a thermo-hygrostat oven maintained at 40° C. and 75% RH, taken out after storage for 30 days, and subjected to tensile elongation measurement as described in paragraph (4) to provide a value Ea of the tensile elongation degree after forced degradation.

A film specimen processed by the procedure described in paragraph (5) or (6) but not subjected to forced degradation was also subjected to tensile elongation measurement as described in paragraph (4) to provide a value Eb of the tensile elongation degree before forced degradation.

Based on the ratio of the tensile elongation after forced degradation, Ea, to the tensile elongation before forced degradation, Eb, (retained tensile elongation rate, Ea/Eb), evaluations were made according to the following criteria:

● (excellent): 0.9 or more
○ (good): 0.8 or more and less than 0.9
Δ (fair): 0.5 or more and less than 0.8
x (failure): less than 0.5.

Resin (A)

(A-1)
Polylactic acid based resin, mass average molecular weight=200,000, D-form content=1.4%, melting point=166° C.

(A-2)
Polylactic acid based resin, mass average molecular weight=200,000, D-form content=5.0%, melting point=150° C.

(A-3)
Polylactic acid based resin, mass average molecular weight=200,000, D-form content=12.0%, melting point=none The above-mentioned average molecular weight was measured using Warters 2690 supplied by Nihon Waters K.K. at a column temperature 40° C. along with polymethyl methacrylate as reference, and also using a chloroform solvent.

To determine the melting point of a polylactic acid based resin, it was first heated at 100° C. for 24 hours in a hot air oven, and then a 5 mg specimen was put on the aluminum tray of an RDC 220 differential scanning calorimeter supplied by Seiko Instruments Inc. and heated from 25° C. up to 250° C. at a heating rate of 20° C./min while measuring the temperature of the crystal melting peak.

Resin (B)

(B-1)
Polybutylene adipate—erephthalate resin (Ecoflex (trade name) FBX7011 supplied by BASF)

(B-2)
Polybutylene succinate resin (GSP1a AZ91T, supplied by Mitsubishi Chemical Corporation)

(B-3)
Polybutylene succinate—adipate resin (Bionolle #3001, supplied by Showa Highpolymer Co., Ltd.)

(B-4)
In a reaction container equipped with a stirrer, 62 parts by mass of polyethylene glycol with a number average molecular weight 8,000, 38 parts by mass of L-lactide, and 0.05 part by mass of tin octylate were mixed and polymerized in a nitrogen atmosphere at 160° C. for 3 hours to produce a block copolymer plasticizer B4 having a polylactic acid segment with a number average molecular weight of 2,500 at each end of polyethylene glycol with a number average molecular weight of 8,000.

Plasticizer (P)

(P-1)
Acetyl tributyl citrate (Citroflex (trade name) A-4, supplied by Pfizer)

Filler (C-1)
Calcium carbonate (Topflow H200 (trade name) supplied by Ajinomoto Fine-Techno Co., Inc., average particle diameter of 1.7 μm, surface-treated with phosphate based compound (containing methacrylate group at terminals), specific surface area S of 2.0 m²/g, percentage by mass T (mass %) of the portion originating from surface treatment agent of 1.8 mass %, T/S=0.90)

(C-2)
Calcium carbonate (E#2010 (trade name) supplied by Sankyo Seifun Co., Ltd., average particle diameter of 1.8 μm, surface-treated with stearate, specific surface area S of 2.0 m²/g, percentage by mass T (mass %) of the portion originating from surface treatment agent of 1.0 mass %, T/S=0.50)

(D1)
Calcium carbonate (#2010 (trade name) supplied by Sankyo Seifun Co., Ltd., average particle diameter of 1.8 μm, surface untreated)(C-3)
Calcium carbonate (Topflow H100 (trade name) supplied by Ajinomoto Fine-Techno Co., Inc., average particle diameter of 3.6 μm, surface-treated with phosphate based compound (containing methacrylate group at terminals), specific surface area S of 1.0 m²/g, percentage by mass T (mass %) of the portion originating from surface treatment agent of 0.7 mass %, T/S=0.70)

(C-4)
Calcium carbonate (average particle diameter of 1.7 μm, surface-treated with phosphate based compound (containing methacrylate group at terminals), specific surface area S of 2.0 m²/g, percentage by mass T (mass %) of the portion originating from surface treatment agent of 0.7 mass %, T/S=0.35)

(C-5)
Calcium carbonate (average particle diameter of 3.6 μm, surface-treated with phosphate based compound (containing methacrylate group at terminals), specific surface area S of 1.0 m²/g, percentage by mass T (mass %) of the portion originating from surface treatment agent of 0.4 mass %, T/S=0.40)

(C-6)
Calcium carbonate (average particle diameter of 1.7 μm, surface-treated with phosphate based compound (containing methacrylate group at terminals), specific surface area S of 2.0 m²/g, percentage by mass T (mass %) of the portion originating from surface treatment agent of 0.5 mass %, T/S=0.25)

Reactive compound (E)

(E1)
Carbodiimide compound (Stabaxol I-LF supplied by Rhein Chemie)

(E2)
Epoxy compound (TEPIC-S supplied by Nissan Chemical Industries, Ltd.) Preparation of polylactic acid based film Example 1

A mixture of 15 parts by mass of a polylactic acid resin (A1), 45 parts by mass of a polylactic acid resin (A3), 20 parts by mass of a polybutylene adipate-terephthalate resin (B1), 20 parts by mass of a block copolymer plasticizer (B4), and 70 parts by a mass of filler (C1) were supplied to a vacuum vent type twin screw extruder with a cylinder temperature of 190° C. and a screw diameter of 44 mm, and melt-kneaded while being deaerated from the vacuum vent portion, mixed to ensure uniformity, and pelletized to provide a composition.

This composition in the form of pellets was vacuum-dried at a temperature of 60° C. for 12 hours in a rotary-drum type vacuum dryer.

This dried composition in the form of pellets was supplied to a single screw extruder, extruded upward into a bubble form at a blow ratio of 2.4 from a spiral type ring die with a cylinder temperature of 180° C., diameter of 250 mm, lip clearance of 1.3 mm, and temperature of 160° C., cooled by a cooling ring, taken up while being folded flat by nip rolls located above the die, and cut open at both ends with an edge cutter to produce two film strips, which were wound up separately to provide films with a final thickness of 100 μm. The draw ratio was 6. Characteristics of the resulting film are shown in Table 1.

Durability evaluations were made with film samples produced for evaluation in processability B (film samples produced by the processing procedure described in paragraph (5)). Examples 2 to 8 and 17 to 29, and Comparative Examples 1 to 3

Except for using film components as given in Table, the same procedure as in Example 1 was carried out to obtain a film. Characteristics of the resulting film are shown in Table 1.

Example 9

A mixture of 15 parts by mass of a polylactic acid resin (A1), 45 parts by mass of a polylactic acid resin (A3), 20 parts by mass of a polybutylene adipate-terephthalate resin (B1), 20 parts by mass of a block copolymer plasticizer (B4), and 70 parts by a mass of filler (C1) was supplied to a vacuum vent type twin screw extruder with a cylinder temperature of 190° C. and a screw diameter of 44 mm, and melt-kneaded while being deaerated from the vacuum vent portion, mixed to ensure uniformity, and pelletized to provide a composition.

This composition in the form of pellets was vacuum-dried at a temperature of 60° C. for 12 hours in a rotary-drum type vacuum dryer.

This dried composition in the form of pellets was supplied to a single screw extruder, extruded upward into a bubble form at a blow ratio of 2.4 from a spiral type ring die with a cylinder temperature of 180° C., diameter of 250 mm, lip clearance of 1.3 mm, and temperature of 160° C., cooled by a cooling ring, taken up while being folded flat by nip rolls located above the die, and cut open at both ends with an edge cutter to produce two film strips, which were wound up separately to provide films with a final thickness of 15 μm. The draw ratio was 36. Characteristics of the resulting film are shown in Table 2.

Durability evaluations were made with film samples produced for evaluation in processability C (film samples produced by the processing procedure described in paragraph (6)). Examples 10 to 16 and 30 to 42, and Comparative Examples 4 to 6

Except for using film components as given in Table 2, the same procedure as in Example 9 was carried out to obtain a film. Characteristics of the resulting film are shown in Table 2.

TABLE 1

| | | | Example 1 | Example 2 | Example 3 | Example 4 | Example 5 | Example 6 |
|---|---|---|---|---|---|---|---|---|
| Composition | resin (A) | type | A1 + A3 | A1 + A3 | A1 + A3 | A1 + A3 | A1 + A3 | A1 + A3 |
| | | (mass %) | 15 + 45 | 15 + 45 | 15 + 45 | 15 + 45 | 15 + 45 | 15 + 45 |
| | resin (B) | type | B1 + B4 | B1 + B4 | B1 + B4 | B1 + B4 | B1 + B4 | B1 + B4 |
| | | (mass %) | 20 + 20 | 20 + 20 | 20 + 20 | 20 + 20 | 20 + 20 | 20 + 20 |
| | filler | type | C1 | C1 | C1 | C1 | C1 | C2 |
| | | (parts by mass) | 70 | 20 | 50 | 100 | 300 | 70 |
| Film properties | tensile modulus (MD/TD) | MPa | 540/531 | 497/490 | 513/510 | 535/530 | 526/517 | 586/570 |
| | heat resistance | — | ○ | ○ | ○ | ○ | ○ | ○ |
| | Bleedout resistance | (%) | 0.5 | 0.7 | 0.6 | 0.4 | 0.2 | 0.5 |
| | processability A (tensile elongation) | — (%) | ● (410) | ● (494) | ● (452) | ● (254) | ○ (129) | ○ (142) |
| | processability B | — | ○ | ○ | ○ | ○ | Δ | Δ |
| | moisture permeability after processing (vapor transmission rate) | (g/(m² · day)) | ● (1550) | ○ (1270) | ○ (1393) | ● (1850) | ● (2181) | ● (1574) |
| | durability (retained tensile elongation rate) | (—) | Δ (0.69) | Δ (0.62) | Δ (0.67) | Δ (0.75) | Δ (0.78) | Δ (0.67) |

| | | | Example 7 | Example 8 | Comparative example 1 | Comparative example 2 | Comparative example 3 |
|---|---|---|---|---|---|---|---|
| Composition | resin (A) | type | A1 + A3 | A1 + A3 | A1 + A3 | A1 | A2 |
| | | (mass %) | 15 + 45 | 15 + 45 | 15 + 45 | 60 | 60 |
| | resin (B) | type | B2 + B4 | B3 + B4 | B1 + B4 | B1 + B4 | B1 + B4 |
| | | (mass %) | 20 + 20 | 20 + 20 | 20 + 20 | 20 + 20 | 20 + 20 |
| | filler | type | C1 | C1 | D1 | C1 | C1 |
| | | (parts by mass) | 70 | 70 | 70 | 70 | 70 |
| Film properties | tensile modulus (MD/TD) | MPa | 658/632 | 548/540 | 609/588 | 772/747 | 673/660 |
| | heat resistance | — | ○ | ○ | ○ | ● | ○ |
| | Bleedout resistance | (%) | 0.5 | 0.5 | 0.5 | 0.3 | 0.4 |
| | processability A (tensile elongation) | — (%) | ● (196) | ● (270) | x (46) | Δ (96) | ○ (141) |

TABLE 1-continued

|  |  |  |  |  |  |  |
|---|---|---|---|---|---|---|
| processability B | — | ○ | ○ | x | x | x |
| moisture permeability after processing (vapor transmission rate) | (g/(m² · day)) | ○ (1318) | ○ (1461) | evaluation impossible | evaluation impossible | evaluation impossible |
| durability (retained tensile elongation rate) | (—) | Δ (0.68) | Δ (0.70) | evaluation impossible | evaluation impossible | evaluation impossible |

TABLE 2

|  |  |  | Example 9 | Example 10 | Example 11 | Example 12 | Example 13 | Example 14 |
|---|---|---|---|---|---|---|---|---|
| Composition | resin (A) | type | A1 + A3 | A1 + A3 | A1 + A3 | A1 + A3 | A1 + A3 | A1 + A3 |
|  |  | (mass %) | 15 + 45 | 15 + 45 | 15 + 45 | 15 + 45 | 15 + 45 | 15 + 45 |
|  | resin (B) | type | B1 + B4 | B1 + B4 | B1 + B4 | B1 + B4 | B1 + B4 | B1 + B4 |
|  |  | (mass %) | 20 + 20 | 20 + 20 | 20 + 20 | 20 + 20 | 20 + 20 | 20 + 20 |
|  | filler | type | C1 | C1 | C1 | C1 | C1 | C2 |
|  |  | (parts by mass) | 70 | 20 | 50 | 100 | 300 | 70 |
| Film properties | tensile modulus (MD/TD) | MPa | 442/426 | 402/390 | 423/414 | 455/432 | 430/416 | 486/479 |
|  | heat resistance | — | ○ | ○ | ○ | ○ | ○ | ○ |
|  | Bleedout resistance | (%) | 0.8 | 1.0 | 0.9 | 0.7 | 0.5 | 0.8 |
|  | processability A (tensile elongation) | (%) | • (235) | • (309) | • (273) | • (146) | Δ (72) | ○ (109) |
|  | processability C | — | ○ | ○ | ○ | ○ | Δ | Δ |
|  | moisture permeability after processing (vapor transmission rate) | (g/(m² · day)) | • (1597) | ○ (1303) | ○ (1410) | • (1866) | • (2190) | • (1633) |
|  | durability (retained tensile elongation rate) | (—) | Δ (0.60) | Δ (0.52) | Δ (0.57) | Δ (0.66) | Δ (0.69) | Δ (0.56) |

|  |  |  | Example 15 | Example 16 | Comparative example 4 | Comparative example 5 | Comparative example 6 |
|---|---|---|---|---|---|---|---|
| Composition | resin (A) | type | A1 + A3 | A1 + A3 | A1 + A3 | A1 | A2 |
|  |  | (mass %) | 15 + 45 | 15 + 45 | 15 + 45 | 60 | 60 |
|  | resin (B) | type | B2 + B4 | B3 + B4 | B1 + B4 | B1 + B4 | B1 + B4 |
|  |  | (mass %) | 20 + 20 | 20 + 20 | 20 + 20 | 20 + 20 | 20 + 20 |
|  | filler | type | C1 | C1 | D1 | C1 | C1 |
|  |  | (parts by mass) | 70 | 70 | 70 | 70 | 70 |
| Film properties | tensile modulus (MD/TD) | MPa | 551/544 | 438/426 | 511/483 | 672/644 | 571/561 |
|  | heat resistance | — | ○ | ○ | ○ | • | ○ |
|  | Bleedout resistance | (%) | 0.8 | 0.8 | 0.8 | 0.6 | 0.7 |
|  | processability A (tensile elongation) | (%) | ○ (115) | ○ (140) | x (21) | Δ (53) | ○ (108) |
|  | processability C | — | ○ | ○ | x | x | x |
|  | moisture permeability after processing (vapor transmission rate) | (g/(m² · day)) | ○ (1378) | ○ (1493) | evaluation impossible | evaluation impossible | evaluation impossible |
|  | durability (retained tensile elongation rate) | (—) | Δ (0.57) | Δ (0.61) | evaluation impossible | evaluation impossible | evaluation impossible |

TABLE 3

|  |  |  | Example 17 | Example 18 | Example 19 | Example 20 | Example 21 | Example 22 | Example 23 |
|---|---|---|---|---|---|---|---|---|---|
| Composition | resin (A) | type | A1 + A3 | A1 + A3 | A1 + A3 | A1 + A3 | A1 + A3 | A1 + A3 | A1 + A3 |
|  |  | (mass %) | 15 + 45 | 15 + 45 | 15 + 45 | 15 + 45 | 15 + 45 | 15 + 45 | 15 + 45 |
|  | resin (B), plasticizer (P) | type | B1 | B4 | B1 + P1 | B1 + B4 | B1 + B4 | B1 + B4 | B1 + B4 |
|  |  | (mass %) | 40 | 40 | 20 + 20 | 20 + 20 | 20 + 20 | 20 + 20 | 20 + 20 |
|  | filler | type | C1 | C1 | C1 | C3 | C4 | C5 | C1 |
|  |  | (parts by mass) | 70 | 70 | 70 | 70 | 70 | 70 | 70 |

TABLE 3-continued

|  |  |  |  |  |  |  |  |  |  |
|---|---|---|---|---|---|---|---|---|---|
| | reactive compound (E) | type | | | | | | | E1 |
| | | (parts by mass) | | | | | | | 2 |
| Film properties | tensile modulus (MD/TD) | MPa | 432/405 | 789/750 | 653/650 | 581/555 | 541/535 | 585/560 | 532/520 |
| | heat resistance | — | ○ | ○ | Δ | ○ | ○ | ○ | ○ |
| | Bleedout resistance | (%) | 0.0 | 1.1 | 6.8 | 0.5 | 0.5 | 0.5 | 0.3 |
| | processability A (tensile elongation) | — (%) | ● (478) | ● (371) | ● (354) | ● (287) | ● (439) | ● (340) | ● (420) |
| | processability B | — | Δ | ○ | ○ | Δ | ○ | Δ | ○ |
| | moisture permeability after processing (vapor transmission rate) | (g/(m²·day)) | Δ (593) | Δ (895) | Δ (978) | ● (1725) | ● (1687) | ● (1777) | ● (1563) |
| | durability (retained tensile elongation rate) | — (—) | ○ (0.81) | Δ (0.59) | Δ (0.58) | Δ (0.68) | ○ (0.88) | ○ (0.86) | ○ (0.89) |

|  |  |  | Example 24 | Example 25 | Example 26 | Example 27 | Example 28 | Example 29 |
|---|---|---|---|---|---|---|---|---|
| Composition | resin (A) | type | A1 + A3 | A1 + A3 | A1 + A3 | A3 | A1 + A3 | A1 + A3 |
| | | (mass %) | 15 + 45 | 15 + 45 | 15 + 45 | 60 | 5 + 35 | 25 + 55 |
| | resin (B), plasticizer (P) | type | B1 + B4 | B1 + B4 | B1 + B4 | B1 + B4 | B1 + B4 | B1 + B4 |
| | | (mass %) | 20 + 20 | 20 + 20 | 20 + 20 | 20 + 20 | 40 + 20 | 10 + 10 |
| | filler | type | C1 | C4 | C6 | C4 | C4 | C4 |
| | | (parts by mass) | 70 | 70 | 70 | 70 | 70 | 70 |
| | reactive compound (E) | type | E2 | E1 | E1 | E1 | E1 | E1 |
| | | (parts by mass) | 2 | 2 | 2 | 2 | 2 | 2 |
| Film properties | tensile modulus (MD/TD) | MPa | 636/620 | 535/531 | 525/520 | 494/483 | 379/373 | 1256/1233 |
| | heat resistance | — | ○ | ○ | ○ | Δ | Δ | ○ |
| | Bleedout resistance | (%) | 0.3 | 0.1 | 0.2 | 2.6 | 0.6 | 0.3 |
| | processability A (tensile elongation) | — (%) | ● (403) | ● (465) | ● (450) | ● (422) | ● (471) | ● (220) |
| | processability B | — | ○ | ○ | ○ | ○ | ○ | ○ |
| | moisture permeability after processing (vapor transmission rate) | (g/(m²·day)) | ● (1594) | ● (1709) | ● (1687) | ○ (1302) | ○ (1264) | ○ (1337) |
| | durability (retained tensile elongation rate) | — (—) | ○ (0.88) | ● (0.97) | ● (0.95) | ● (0.94) | ● (0.98) | ● (0.97) |

TABLE 4

|  |  |  | Example 30 | Example 31 | Example 32 | Example 33 | Example 34 | Example 35 | Example 36 |
|---|---|---|---|---|---|---|---|---|---|
| Composition | resin (A) | type | A1 + A3 | A1 + A3 | A1 + A3 | A1 + A3 | A1 + A3 | A1 + A3 | A1 + A3 |
| | | (mass %) | 15 + 45 | 15 + 45 | 15 + 45 | 15 + 45 | 15 + 45 | 15 + 45 | 15 + 45 |
| | resin (B), plasticizer (P) | type | B1 | B4 | B1 + P1 | B1 + B4 | B1 + B4 | B1 + B4 | B1 + B4 |
| | | (mass %) | 40 | 40 | 20 + 20 | 20 + 20 | 20 + 20 | 20 + 20 | 20 + 20 |
| | filler | type | C1 | C1 | C1 | C3 | C4 | C5 | C1 |
| | | (parts by mass) | 70 | 70 | 70 | 70 | 70 | 70 | 70 |
| | reactive compound (D) | type | | | | | | | E1 |
| | | (parts by mass) | | | | | | | 2 |
| Film properties | tensile modulus (MD/TD) | MPa | 344/323 | 700/676 | 543/554 | 507/472 | 446/436 | 497/469 | 458/438 |
| | heat resistance | — | ○ | ○ | Δ | ○ | ○ | ○ | ○ |
| | bleedout resistance | (%) | 0.0 | 1.3 | 7.3 | 0.7 | 0.7 | 0.7 | 0.4 |

TABLE 4-continued

| | | | | | | | | | |
|---|---|---|---|---|---|---|---|---|---|
| processability A (tensile elongation) | (%) | — | ● (286) | ● (221) | ● (217) | ● (184) | ● (257) | ● (206) | ● (250) |
| processability C | — | | △ | ○ | ○ | △ | ○ | △ | ○ |
| moisture permeability after processing (vapor transmission rate) | (g/(m²·day)) | — | △ (628) | △ (941) | ○ (1033) | ● (1845) | ● (1699) | ● (1794) | ● (1604) |
| durability (retained tensile elongation rate) | (—) | — | ○ (0.74) | △ (0.51) | △ (0.50) | △ (0.60) | ○ (0.82) | ○ (0.81) | ○ (0.83) |

| | | | | Example 37 | Example 38 | Example 39 | Example 40 | Example 41 | Example 42 |
|---|---|---|---|---|---|---|---|---|---|
| Composition | resin (A) | | type | A1 + A3 | A1 + A3 | A1 + A3 | A3 | A1 + A3 | A1 + A3 |
| | | | (mass %) | 15 + 45 | 15 + 45 | 15 + 45 | 60 | 5 + 35 | 25 + 55 |
| | resin (B), plasticizer (P) | | type | B1 + B4 | B1 + B4 | B1 + B4 | B1 + B4 | B1 + B4 | B1 + B4 |
| | | | (mass %) | 20 + 20 | 20 + 20 | 20 + 20 | 20 + 20 | 40 + 20 | 10 + 10 |
| | filler | | type | C1 | C4 | C6 | C4 | C4 | C4 |
| | | | (parts by mass) | 70 | 70 | 70 | 70 | 70 | 70 |
| | reactive compound (D) | | type | E2 | E1 | E1 | E1 | E1 | E1 |
| | | | (parts by mass) | 2 | 2 | 2 | 2 | 2 | 2 |
| Film properties | tensile modulus (MD/TD) | | MPa | 531/522 | 471/462 | 462/454 | 384/363 | 305/293 | 1049/1021 |
| | heat resistance | | — | ○ | ○ | ○ | △ | △ | ○ |
| | bleedout resistance | | (%) | 0.4 | 0.2 | 0.3 | 2.9 | 0.7 | 0.4 |
| | processability A (tensile elongation) | | — (%) | ● (236) | ● (273) | ● (270) | ● (252) | ● (281) | ○ (133) |
| | processability C | | — | ○ | ○ | ○ | ○ | ○ | ○ |
| | moisture permeability after processing (vapor transmission rate) | | (g/(m²·day)) | ● (638) | ● (1788) | ● (1761) | ○ (1368) | ○ (1292) | ○ (1400) |
| | durability (retained tensile elongation rate) | | (—) | ○ (0.82) | ● (0.93) | ● (0.91) | ● (0.90) | ● (0.93) | ● (0.93) |

In the tables, "mass %" for resin (A) and resin (B) refers to a proportion relative to the total mass of resin (A) and resin (B), which accounts for 100 mass %. "Parts by mass" for filler (C) refers to a proportion relative to the total mass of resin (A) and resin (B), which accounts for 100 parts by mass.

INDUSTRIAL APPLICABILITY

Our film is a mainly polylactic acid based film that is high in flexibility, heat resistance, bleed-out resistance, and durability and also high in processability such as for stretching and embossing required to develop high moisture permeability, and can serve as film to be processed by, for instance, stretching and embossing to produce materials for medical care and sanitary supplies such as back sheets of bed sheet, pillowcase, sanitary napkin, and other absorbent products; clothing materials such as rainwear and gloves; garbage bag and compost bag; food bags for vegetables and fruits; and bags for industrial products and other packaging materials.

The invention claimed is:

1. A polylactic acid based film comprising a composition containing a polylactic acid based resin (A), a thermoplastic resin other than polylactic acid based resin (B), and a compound treated with a surface treatment agent as filler (C), the polylactic acid based resin containing a crystalline polylactic acid based resin and an amorphous polylactic acid based resin, and resin (A) accounting for 10 to 95 mass % and resin (B) accounting for 5 to 90 mass % of a combined total of 100 mass % of resin (A) and resin (B), and filler (C) accounting for 10 to 400 parts by mass per a combined total of 100 parts by mass of resin (A) and resin (B).

2. The polylactic acid based film as described in claim 1, wherein the surface treatment agent is a phosphate based compound and/or fatty acid.

3. The polylactic acid based film as described in claim 1, wherein the surface treatment agent contains a methacrylate group.

4. The polylactic acid based film as described in claim 1, wherein filler (C) is produced by subjecting an inorganic filler and/or organic filler to treatment with a surface treatment agent and specific surface area S (m²/g) of the inorganic filler and/or organic filler and percentage by mass T (mass %) of that portion of filler (C) originating from the surface treatment agent satisfies $0.15 \leq T/S \leq 0.45$.

5. The polylactic acid based film as described in claim 1, wherein resin (B) is at least one resin selected from the group consisting of a block copolymer containing a polyether based segment and a polylactic acid segment, a block copolymer containing a polyester based segment and a polylactic acid segment, an aliphatic polyester based resin, and an aliphatic-aromatic polyester based resin.

6. The polylactic acid based film as described in claim 5, wherein resin (B) comprises at least one resin selected from the group consisting of a block copolymer containing a polyether based segment and a polylactic acid segment and a block copolymer containing a polyester based segment and a polylactic acid segment and at least one resin selected from the group consisting of an aliphatic polyester based resin and an aliphatic-aromatic polyester based resin.

7. The polylactic acid based film as described in claim 1, produced from a composition prepared by reacting resin (A) and/or resin (B) with a reactive compound.

8. The polylactic acid based film as described in claim 1, having a tensile elongation percentage of 150 to 500%.

9. The polylactic acid based film as described in claim 1, having a tensile modulus of 100 to 1,500 MPa.

10. A polylactic acid based film comprising a composition containing a polylactic acid based resin as resin (A) and containing filler (C) and/or filler (D) in an amount of 10 to 400 parts by mass per a total mass of resin which accounts for 100 parts by mass,
 filler (C) being a compound treated with a surface treatment agent,
 filler (D) being an inorganic filler and/or organic filler untreated with a surface treatment agent, and
 has a tensile elongation percentage of 150 to 500%.

11. The polylactic acid based film as described in claim 2, wherein the surface treatment agent contains a methacrylate group.

12. The polylactic acid based film as described in claim 2, wherein filler (C) is produced by subjecting an inorganic filler and/or organic filler to treatment with a surface treatment agent and specific surface area S ($m^2$/g) of the inorganic filler and/or organic filler and percentage by mass T (mass %) of that portion of filler (C) originating from the surface treatment agent satisfies $0.15 \leq T/S \leq 0.45$.

13. The polylactic acid based film as described in claim 3, wherein filler (C) is produced by subjecting an inorganic filler and/or organic filler to treatment with a surface treatment agent and specific surface area S (m2/g) of the inorganic filler and/or organic filler and percentage by mass T (mass %) of that portion of filler (C) originating from the surface treatment agent satisfies $0.15 \leq T/S \leq 0.45$.

14. The polylactic acid based film as described in claim 2, wherein resin (B) is at least one resin selected from the group consisting of a block copolymer containing a polyether based segment and a polylactic acid segment, a block copolymer containing a polyester based segment and a polylactic acid segment, an aliphatic polyester based resin, and an aliphatic-aromatic polyester based resin.

15. The polylactic acid based film as described in claim 3, wherein resin (B) is at least one resin selected from the group consisting of a block copolymer containing a polyether based segment and a polylactic acid segment, a block copolymer containing a polyester based segment and a polylactic acid segment, an aliphatic polyester based resin, and an aliphatic-aromatic polyester based resin.

16. The polylactic acid based film as described in claim 4, wherein resin (B) is at least one resin selected from the group consisting of a block copolymer containing a polyether based segment and a polylactic acid segment, a block copolymer containing a polyester based segment and a polylactic acid segment, an aliphatic polyester based resin, and an aliphatic-aromatic polyester based resin.

17. The polylactic acid based film as described in claim 2, produced from a composition prepared by reacting resin (A) and/or resin (B) with a reactive compound.

18. The polylactic acid based film as described in claim 3, produced from a composition prepared by reacting resin (A) and/or resin (B) with a reactive compound.

19. The polylactic acid based film as described in claim 4, produced from a composition prepared by reacting resin (A) and/or resin (B) with a reactive compound.

20. The polylactic acid based film as described in claim 5, produced from a composition prepared by reacting resin (A) and/or resin (B) with a reactive compound.

* * * * *